(12) United States Patent
Leinonen et al.

(10) Patent No.: US 6,826,391 B2
(45) Date of Patent: Nov. 30, 2004

(54) TRANSMISSION AND RECEPTION ANTENNA SYSTEM FOR SPACE DIVERSITY RECEPTION

(75) Inventors: Marko E. Leinonen, Oulu (FI); Tomi Kangasvieri, Oulu (FI)

(73) Assignee: Nokia Corporation, Espoo (FI)

( * ) Notice: Subject to any disclaimer, the term of this patent is extended or adjusted under 35 U.S.C. 154(b) by 440 days.

(21) Appl. No.: 10/100,275

(22) Filed: Mar. 15, 2002

(65) Prior Publication Data

US 2003/0176176 A1 Sep. 18, 2003

(51) Int. Cl.[7] .............................. H04B 1/06; H04B 7/00; H04B 1/38
(52) U.S. Cl. ................... 455/277.1; 455/101; 455/121; 455/193.1; 455/575.7; 455/78
(58) Field of Search .............................. 455/77–78, 101, 455/121, 193.1, 277.1, 552.1, 553.1, 562.1, 575.7

(56) References Cited

U.S. PATENT DOCUMENTS

| | | | | |
|---|---|---|---|---|
| 5,913,153 A | * | 6/1999 | Nakamoto et al. | 455/78 |
| 5,926,503 A | * | 7/1999 | Kelton et al. | 375/148 |
| 5,953,659 A | * | 9/1999 | Kotzin et al. | 455/422.1 |
| 6,018,651 A | * | 1/2000 | Bruckert et al. | 455/277.1 |
| 6,108,526 A | * | 8/2000 | van der Plas | 455/78 |
| 6,204,817 B1 | * | 3/2001 | Edvardsson | 343/702 |
| 6,360,089 B1 | * | 3/2002 | Saitoh | 340/7.1 |
| 6,757,267 B1 | * | 6/2004 | Evans et al. | 370/334 |

OTHER PUBLICATIONS

"Antennas for the Next–Generation Wideband CDMA Handy–Phone System"; N. Kuga et al.; Hitachi Cable Review No. 18; Oct. 1999.

* cited by examiner

Primary Examiner—Simon Nguyen
(74) Attorney, Agent, or Firm—Ware, Fressola, Van Der Sluys & Adolphson LLP

(57) ABSTRACT

A method and device for achieving space diversity reception in a system that has a first antenna and a second antenna disposed apart from each other over a quarter wavelength of the operating frequency, wherein the first antenna is optimally tuned to a first frequency for receiving signals in an operating mode. In its first function, the second antenna is optimally tuned to a second frequency for transmitting signals in the same mode or for receiving signals in a different mode. In its second function, the second antenna can be tuned to the first frequency so that it also receives signals in the first frequency in the same mode as the first antenna. The signals in the first frequency received by the second antenna are combined with the signals received by the first antenna.

24 Claims, 8 Drawing Sheets

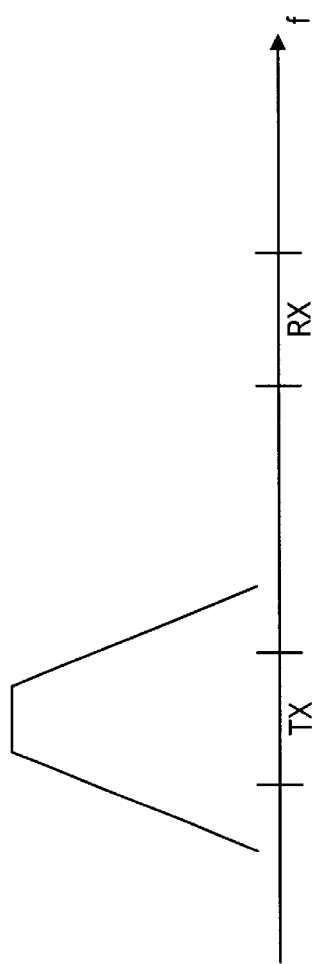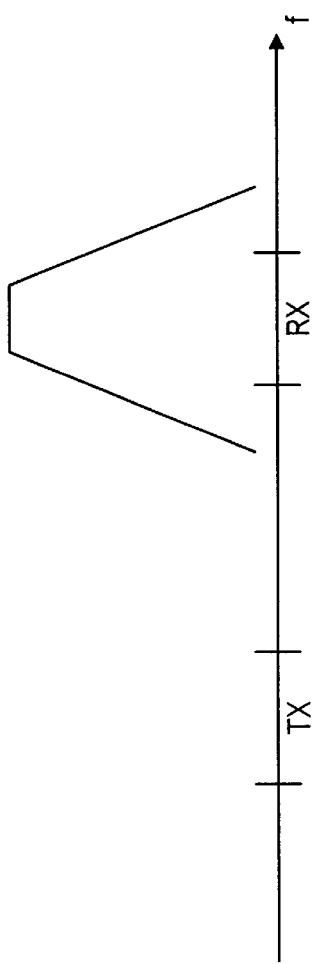

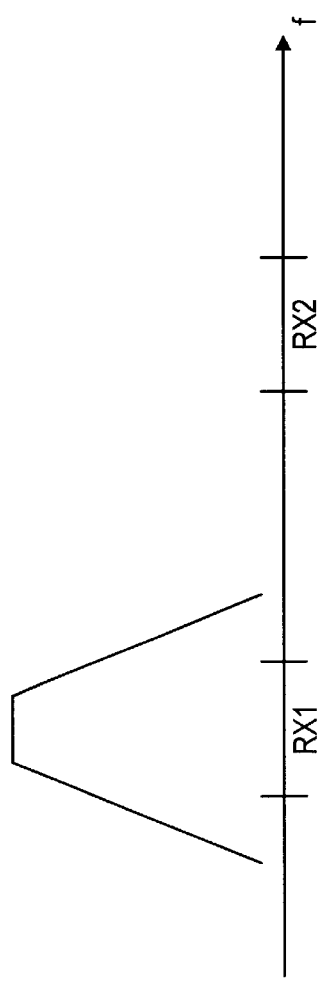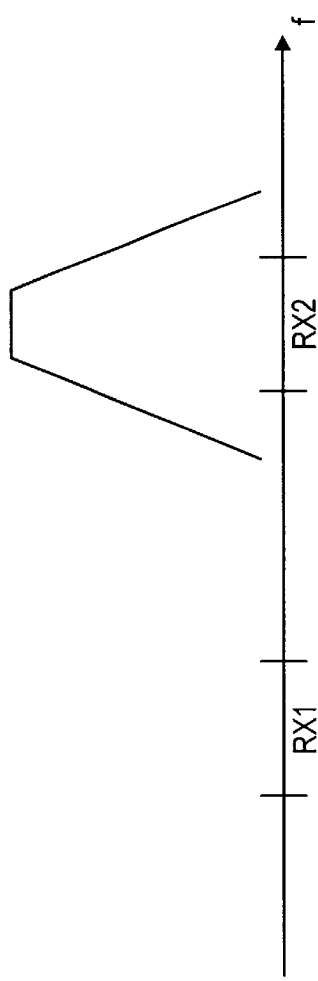

TRANSMISSION AND RECEPTION ANTENNA SYSTEM FOR SPACE DIVERSITY RECEPTION

FIELD OF THE INVENTION

The present invention relates generally to a radio frequency antenna system and, more specifically, to an antenna system for use in a hand-held telecommunication device, such as a mobile terminal.

BACKGROUND OF THE INVENTION

A general approach in two-way radio communication is to use a common antenna operatively connected to a transmitter and a receiver via a duplex filter or an antenna switch for transmitting and receiving signals, respectively. Alternatively, two antennas are used, each with a separate filter. One antenna is used for transmission and the other for reception. When only a single antenna is used for reception, the received signals could be severely degraded due to phase-interference fading caused by multipath.

It is known that the effects of fading in radio communications and broadcast can be reduced by the simultaneous use of two or more physically separate antennas. If one antenna is in deep fading, the other may be in a useful reception condition. This technique is commonly referred to as space diversity. When two or more reception antennas are placed apart from each other, preferably over a distance exceeding a quarter wavelength of the received signals, for reducing the effects of fading in order to enhance coverage probability or better quality of service, the signals received from different reception antennas can be combined in a suitable manner, such as maximal ratio combining.

In a mobile terminal where a separate transmission antenna and reception antenna are used for transmitting and receiving signals, the transmission antenna and the reception antenna are tuned to different frequencies in an FDD (frequency division duplex) mode. As such, the transmission antenna does not work well at reception frequencies. In order to combat signal degradations due to fading using the space diversity scheme, additional antennas are needed. The additional antennas and their associated hardware will increase the manufacturing cost of the mobile terminal.

It is advantageous and desirable to provide a method and system for realizing space diversity in a hand-held telecommunications device without substantially increasing the manufacturing cost.

SUMMARY OF THE INVENTION

In a TDMA (time-division multiple access) type of transmission, the reception and transmission of signals are not necessarily or always active at the same time. For example, in a normal GSM (global system for mobile communications) system, one frame is divided into eight slots. In a normal GSM call, only one transmission slot and one reception slot are used at different times. In a GPRS (general packet radio system) system, more slots come into use. The GPRS terminals are classified as Type 1 and Type 2. In type 1, the terminal operates either in the reception mode or in the transmission mode. In type 2, the terminal can simultaneously operate in the transmission mode and in the reception mode.

When a type 1 terminal is implemented with separate transmission and reception antennas, the transmission antenna is not in use at all times. According to the present invention, the transmission antenna can be used as another reception antenna in the space diversity scheme. As mentioned earlier, the transmission and reception in an FDD system are carried out at different frequencies, rendering the transmission antenna relatively ineffective at the reception frequencies. According to the present invention, the transmission antenna, which is optimally tuned for transmitting, can be tuned to the reception band at least part of the time when the transmission antenna is not used for transmission.

In the United States, for example, several systems are operating at the same frequency band—e.g. PCS band, which is used for Personal Communication Systems or a second generation cellular system, operating partly on the IMT (International mobile telephony)-2000 band. Such systems are: TDMA, GSM, IS-95 (narrow-band code-division multiple access or CDMA) and the forthcoming wideband CDMA (WCDMA). For use in such a frequency band, a multiple mode terminal may have more than one radio frequency (RF) receiver path. In addition, the U.S. multimode terminal may also be operable at the cellular band or 800 band. At the cellular band TDMA, GSM, IS-95 systems can be operating at the same time. The GSM-850 antenna, which is optimally tuned to the GSM-850 band for transmission and reception when the terminal is used for the GSM-850 mode, can be tuned to the PCS band for space diversity reception when the terminal is used for any of the PCS systems.

Thus, according to the first aspect of the present invention, there is provided a radio frequency antenna system capable of operating in a transmission mode and a reception mode. The antenna system comprises:
  a first antenna optimally tuned for receiving signals in a first frequency band;
  a second antenna optimally tuned for transmitting signals in a second frequency band different from the first frequency band when the system is operating in the transmission mode; and
  means, operatively connected to the second antenna, for tuning the second antenna to a third frequency band substantially equal to the first frequency band when the system is operating in the reception mode so that the second antenna also receives the signals in the first frequency band.

Preferably, the antenna system also comprises means, operatively connected to the first antenna and the second antenna when the system is operating in the reception mode, for combining the signals in the first frequency band received by the second antenna and the signals received by the first antenna. The combining of signals can be carried out in an analog fashion or a digital fashion.

According to the first aspect of the present invention, the first antenna is disposed apart from the second antenna by a distance substantially equal to or exceeding a quarter wavelength of the first frequency band.

According to the second aspect of the present invention, there is provided a method of transmitting and receiving radio frequency signals in a telecommunications device, the telecommunications device having
  a first antenna optimally tuned for receiving signals in a first frequency band; and
  a second antenna operable in a transmission mode and a reception mode, wherein the second antenna is optimally tuned for transmitting signals in a second frequency band different from the first frequency band when the second antenna is operating in the transmission mode. The method comprises the step of tuning the second antenna to a third frequency band substantially equal to the first frequency band when the second antenna is operating in the reception mode so that the second antenna also receives the signals in the first frequency band.

Preferably, the method further comprises the step of combining the signals in the first frequency received by the second antenna and the signals received by the first antenna.

According to the third aspect of the present invention, there is provided a radio receiver system operable in a first mode and a second mode, the system having a first subsystem and a second subsystem, wherein the first subsystem includes a first receiver and a first antenna capable of receiving signals in the first mode in a first frequency range for providing the received signals to the first receiver, and the second subsystem includes a second receiver and a second antenna capable of receiving signals in the second mode in a second frequency range different from the first frequency range for providing the received signals to the second receiver. The radio receiver system comprises:

a first means, operatively connected to the first antenna, for tuning the first antenna to a reception frequency in the second frequency range when the system is operating in the second mode, such that the first antenna also receives the signals in the second mode in the second frequency range; and a second means, operatively connected to the first antenna and the second receiver, for routing the signals received by the first antenna in the second mode to the second receiver.

Advantageously, the radio receiver system further comprises:

a third means, operatively connected to the second antenna, for tuning the second antenna to a reception frequency in the first frequency range when the system is operating in the first mode, such that the second antenna also receives the signals in the first mode in the first frequency range; and a fourth means, operatively connected to the second antenna and the first receiver, for routing the signals received by the second antenna in the first mode to the first receiver.

According to the fourth aspect of the present invention, there is provided a radio communication system including a first subsystem and a second subsystem, wherein the first subsystem includes a receiver operating at a first frequency range, and the second subsystem includes a transmitter operating at a second frequency range different from the first frequency range. The radio communication system comprises:

a first antenna operatively connected to the receiver and optimally tuned for receiving signals in the first frequency range and conveying the received signals to the receiver when the system is used for reception;

a second antenna operatively connected to the transmitter and optimally tuned to the second frequency for transmitting signals from the transmitter when the system is used for transmission;

a tuning mechanism, operatively connected to the second antenna for tuning the second antenna to a third frequency range substantially equal to the first frequency range when the system is used for reception, so that the second antenna also receives signals in the first frequency range; and means, operatively connected to the second antenna and the receiver, for conveying signals in the first frequency range received by the second antenna to the receiver when the system is used for reception.

Advantageously, when the first subsystem is operable in a first mode and in a different second mode, and the receiver is operable in a first mode, the first subsystem further includes:

further receiver operable in the second mode, and a switching means, operatively connected to the receiver, the further receiver and the first antenna for conveying the signals received by the first antenna to the receiver when the first subsystem is operating in a first mode, and for conveying the signals received for the second antenna to the further receiver when the first subsystem is operating in the second mode.

Advantageously, when the second subsystem is operable in the first mode and in the second ode and the transmitter is operable in the first mode, the second subsystem further includes:

a further transmitter operable in the second mode, and a further switching means, operatively connected to the transmitter, the further transmitter and the second antenna, for conveying the signals received by the second antenna to the transmitter when the second subsystem is operating in the first mode, and conveying the signals received by the second antenna to the further transmitter when the second subs stem is operating in the second mode.

According to the fifth aspect of the present invention, there is provided a method of radio telecommunications in a telecommunications device operable in a first mode in a first frequency range and a second mode in a second frequency range different from the first frequency range, wherein the device includes:

a first antenna capable of receiving signals in the first frequency range and conveying the received signals in the first frequency range to a first receiver, when the device is operating in the first mode; and a second antenna capable of receiving signals in the second frequency range and conveying the received signals in the second frequency range to a second receiver, when the device is operating in the second mode. The method comprises the steps of:

tuning the first antenna to a reception frequency in the second frequency range when the device is operating in the second mode, such that the first antenna also receives the signals is the second frequency range; and providing the signals received in the second frequency range by the first antenna to the second receiver.

Advantageously, the method further comprises the steps of:

tuning the second antenna to a reception frequency in the first frequency range when the device is operating in the first mode, such that the second antenna also receives the signals the first frequency range; and providing the signals received in the first frequency range by the second antenna to the first receiver.

The present invention will be apparent upon reading the description taken in conjunction with FIGS. 1a–5.

BRIEF DESCRIPTION OF THE DRAWINGS

FIG. 2a is a diagrammatic representation showing the transmission frequency of a transmission antenna, which is different from the reception frequency.

FIG. 2b is a diagrammatic representation showing the transmission antenna is tuned to the reception frequency for space diversity reception.

FIG. 3a is a diagrammatic representation showing the reception frequency of a reception antenna of a first antenna system, which is different from the reception frequency of a second antenna system.

FIG. 3b is a diagrammatic representation showing the reception antenna of the first antenna system is tuned to the reception frequency of the second antenna system for space diversity reception.

BEST MODE TO CARRY OUT THE INVENTION

Figure 1A:
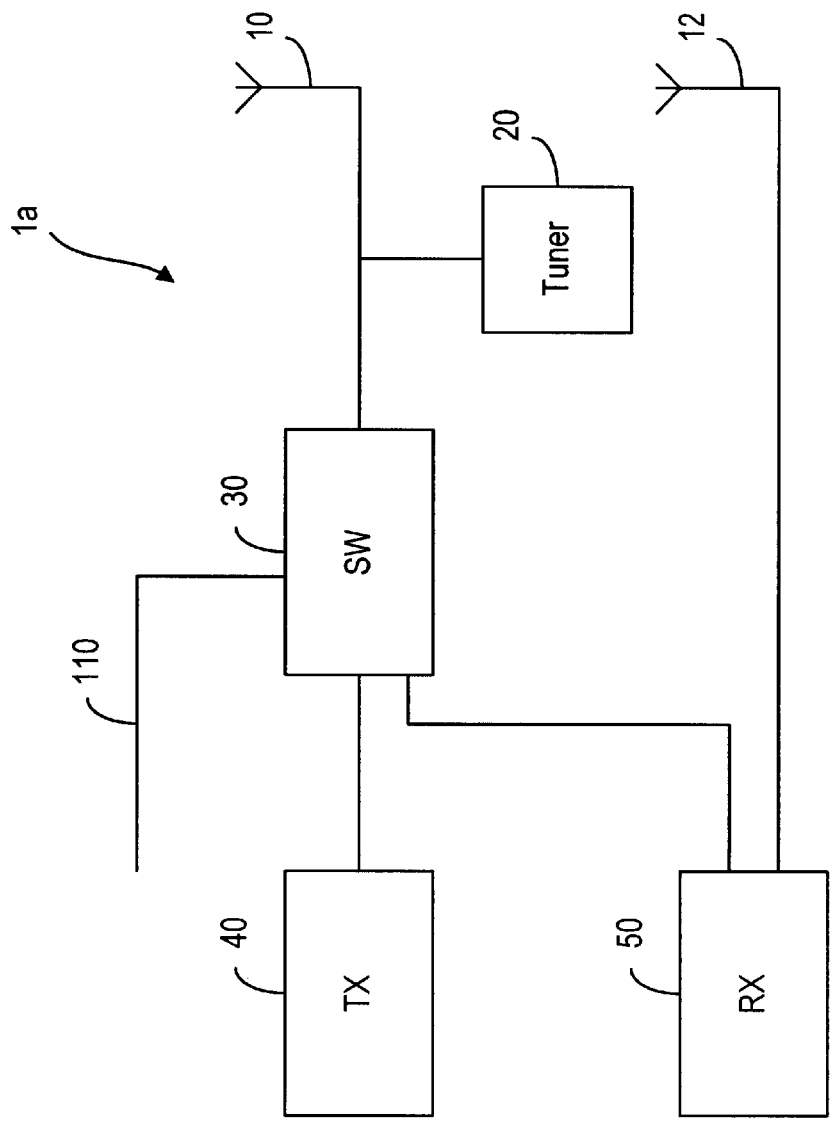
FIG. 1a is a block diagram showing an antenna system having a transmission antenna and a reception antenna, wherein the transmission antenna can be tuned to the reception frequency.

In a DMA system, such as in GPRS or E-GPRS type 1 terminals, the transmission reception are not active at the same time. Thus, it is possible to use the transmission as another reception antenna for space diversity purposes. As shown in FIG. 1a, an antenna system 1a has a first antenna 12 operatively connecting to a receiver 50 and a second antenna 10 operatively connecting a transmitter 40. The antenna system 1a is used for TDMA-type transmission in a type 1, and possibly type 2, terminal. When the antenna system 1a is operating in the transmission mode, only the antenna 10 is used. The antenna 10 is optimally tuned to a transmission frequency (see FIG. 2a) for transmission. When the antenna system 1a is operating in the reception mode, the antenna 12, which is optically tuned to a reception frequency (see FIG. 2b), is used for reception. The antenna 10 and the antenna 12 are placed apart from each other, preferably at a distance exceeding a quarter wavelength of the operating frequency, so that the antenna 10 can also be used for reception in a space diversity scheme. A tuner 20 is used to tune the antenna 10 to the reception frequency when the antenna 10 is not used for transmission so that the antenna 10 can be used as another reception antenna. Additionally a switch 30, under a control signal 110, is used to route the signals received by the antenna 10 to the receiver 50 when the antenna 10 is tuned to the reception frequency. The switch 30 also operatively connects the transmitter 40 to the antenna 10 when the antenna system is operating in the transmission mode.

Figure 1B:
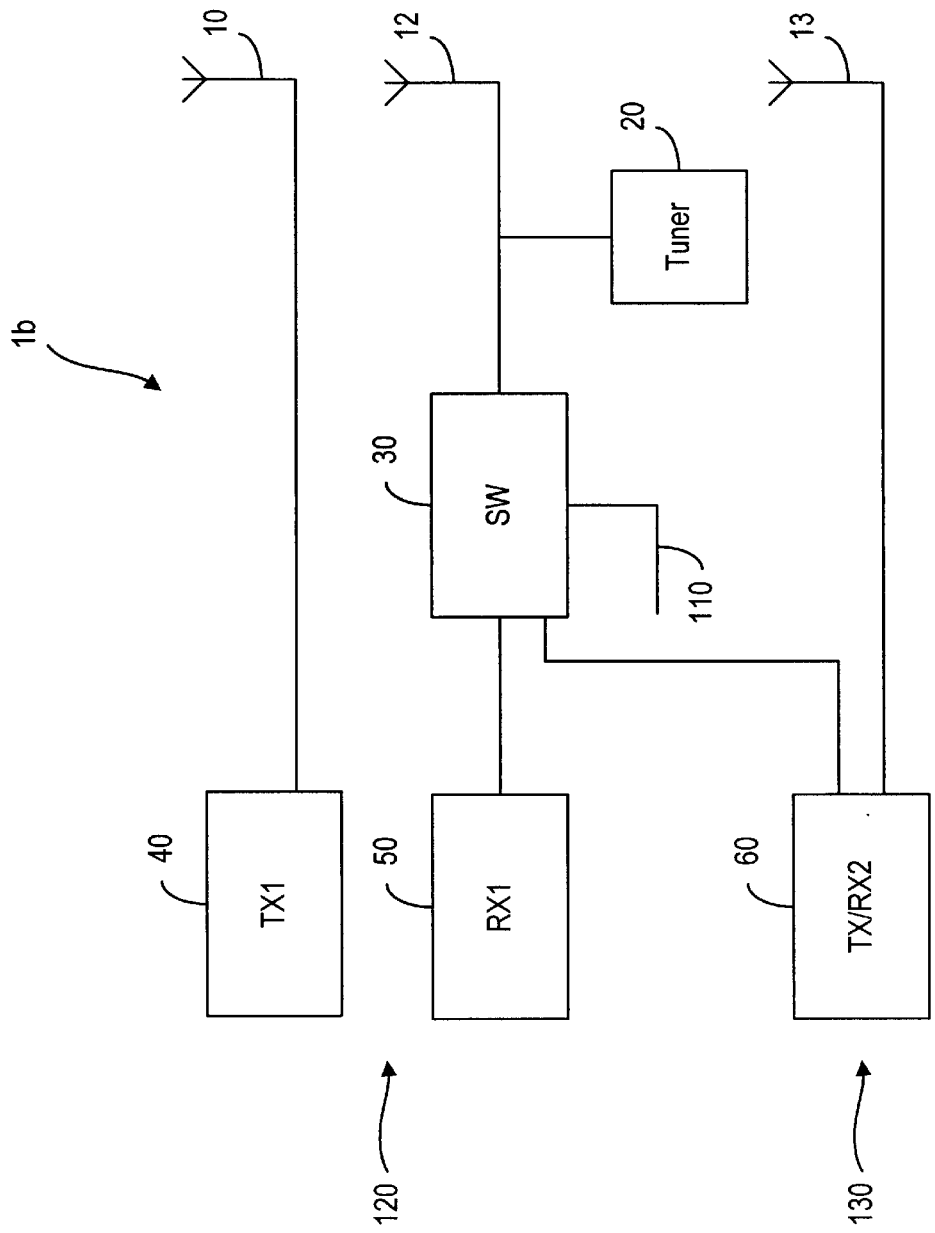
FIG. 1b is a block diagram showing an antenna system having a transmission antenna and a reception antenna operating at a first frequency range and a transceiver antenna operating at a second frequency range, wherein the reception antenna of the first frequency rage can be tuned to the reception frequency of the second frequency range.

When the communication system includes two reception antennas, each of which is operating a different frequency range, the two reception antennas can be tuned for space diversity reception. As shown in FIG. 1b, the communication system 1b includes a first subsystem 120 and a second subsystem 130, each operating in a different frequency range. For example, the subsystem 120, which is operating in a GSM-850 mode, has a transmitter 4 operatively connected to a transmission antenna 10 and a receiver 50 operatively connected to a reception antenna 12. The subsystem 130, which is operating in a WCDMA-1900 mode, has a transceiver 60 operatively connected to an antenna 13. The reception antenna 12 is optimally tuned at the reception frequency of the GSM-850 mode. At any time, the system 1b can only be operating either in the GSM-850 mode or in the WCDMA-1900 mode. When the system 1b is operating in the GSM-850 mode, the subsystem 130 is not used. The switch 30, under the control signal 110, routes the received signals from the antenna 12 to the receiver 50. When the system 1b is operating in the WCDMA-1900 mode, the transceiver 60 receives signals from the antenna 13. At the same time. the antenna 12 can be tuned by the tuner 20 to the reception frequency of the WCDMA-1900 mode, and the switch 30 routes the received signals from the antenna 12 to the transceiver 60. Preferably, the antenna 12 and the antenna 13 are placed apart from each other over a distance exceeding a quarter wavelength of the WCDMA frequency, so that these two antennas can be used to reduce the effects of fading on the received WCDMA signals.

Figure 1C:
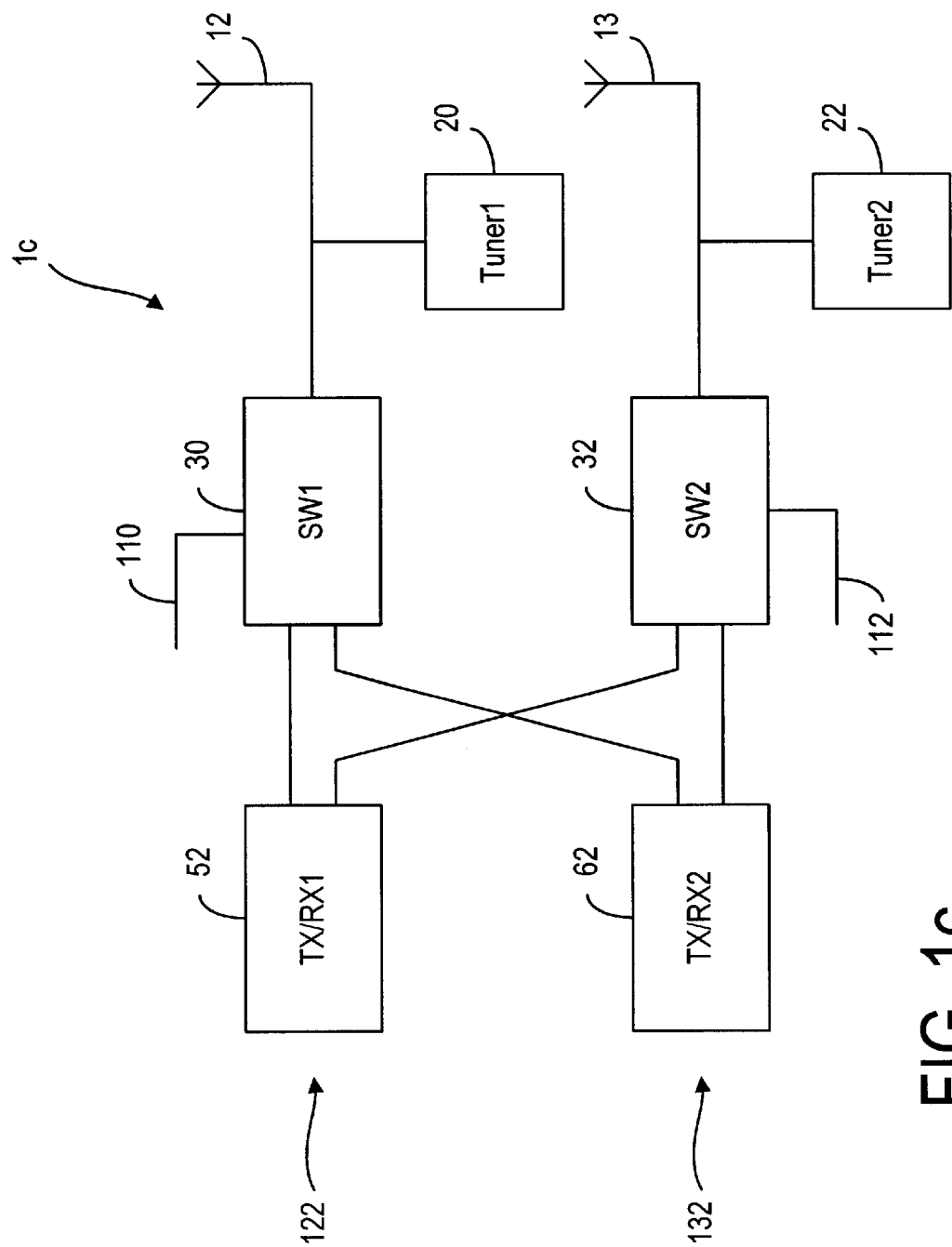
FIG. 1c is a block diagram showing an antenna system having a first transceiver antenna operating at a first frequency range and a second transceiver antenna operating at a second frequency range, wherein each transceiver antenna can be tuned to the reception frequency of the other transceiver antenna.

In a different embodiment, as shown in FIG. 1c, the system 1c includes a first subsystem 122 operating in the GSM-850 mode, and a second subsystem 132 operating in the WCDMA-1900 mode, for example. The subsystem 122 includes a transceiver 52 operatively connected to an antenna 12, and the subsystem 132 includes a transceiver 62 operatively connected to the antenna 13. The antenna 12 is optimally tuned at the reception frequency of the GSM-850 mode to receive the GSM signals, whereas the antenna 13 is optimally tuned at the reception frequency of the WCDMA-1900 mode to receive the WCDMA signals. At any time, the system 1c can only be operating either in the GSM-850) mode or in the WCDMA mode. When the system 1c is operating in the WCDMA mode, it is possible to tune the antenna 12 by the tuner 20 to the reception frequency of the WCDMA-1900 mode so that the antenna 12 also receives signals in the WCDMA mode. At the same time, the received signals from the antenna 12 are routed by the switch under the control signal 110, to the transceiver 62. Likewise, when the system 1c is operating in the GSM mode, it is possible to tune the antenna 13 by a tuner 22 to the reception frequency of the GSM-850 mode so that the antenna 13 also receives signals in GSM mode. At the same time, the received signals from the antenna 12 are routed by a switch 32, under a control signal 112, to the transceiver 62. Preferably, the antenna 12 and the antenna 13 are placed apart from each other, over a distance exceeding a quarter wavelength of the GSM-850 frequency, so that these two antennas can be used to reduce the of fading on the received signals.

Figure 1D:
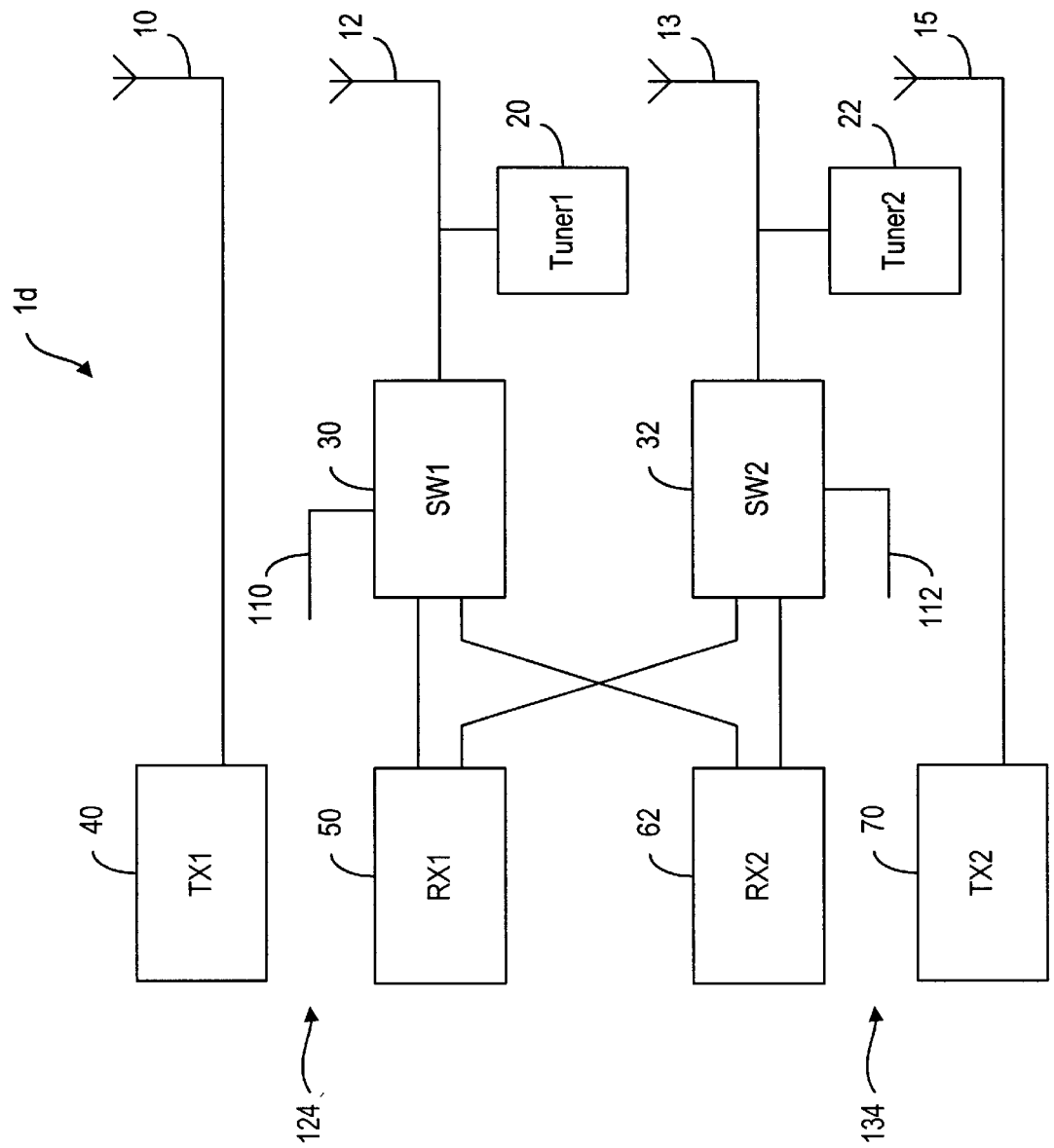
FIG. 1d is a block diagram showing an antenna system having a first subsystem and a second wherein the first subsystem includes a transmission antenna and a reception antenna operating a first frequency range, and the second subsystem includes a transmission antenna and a reception operating at a second frequency range, and wherein the reception antenna of one subsystem can be tuned to the reception frequency of the other subsystem.

In yet another embodiment, as shown in FIG. 1d, the system 1d includes a first subsystem 124 operating in the GSM-850 mode, and a second subsystem 134 operating in the WCDMA-1900 mode, for example. In the subsystem 124, the transmission antenna 10 is operatively connected to the transmitter 40, and the reception antenna 12 is operatively connected to the receiver 50 via the switch 30. The antenna 12 is optimally tuned at the reception frequency of the GSM-850 mode to receive the GSM signals. In the subsystem 134, a transmission antenna 15 is operatively connected to a transmitter 70, and a receipt on antenna 13 is operatively connected to a receiver 62 via a switch 32. The antenna 13 optimally tuned at the reception frequency of the WCDMA-1900 mode to receive the WCDMA signals. At any time, the system 1$d$ can only be operating either in the GSM-850 mode or in the WCDMA mode. When the system 1$d$ is operating in the WCDMA mode, it is possible to tune the antenna 12 to the reception frequency of the WCDMA-1900 mode by the tuner 20 so that the antenna 12 also receives signals in the WCMA mode. At the same time, the signals in the WCDMA mode received by the antenna 12 are routed by the switch 30, under the control signal 110, to the receiver 62 of the subsystem 134. Similarly, when the system 1$d$ is operating in the GSM mode, it is possible to tune the antenna 13 to the reception frequency of the GSM-850 mode by a tuner 22 so that the antenna 13 also receives signals in the GSM mode. At the same time, the signals in the GSM mode received by the antenna 13 are routed by the switch 32, under a control signal 112, to the receiver 50 of the subsystem 124. Preferably, the antenna 12 and the antenna 13 are placed apart from each other, over a distance exceeding a quarter wavelength of the GSM-850 frequency, so that these two antennas can be used to reduce the effects of fading on the received signals.

FIGS. 2$a$ and 2$b$ show the difference between the transmission frequency and the reception frequency in an FDD system. For example, in IMT-2000, each of the transmission frequency bands and the reception frequency bands has a 60 MHz bandwidth with a separation of about 200 MHz. The transmission antenna (the antenna 10 of FIGS. 1$a$, and 1$b$ the antenna 15 of FIG. 1$d$ for example) is optimally tuned at the transmission frequency (TX in FIGS. 2$a$ and 2$b$) for transmission, as shown in FIG. 2$a$. As such, the transmission antenna does not work efficiently at the reception frequency (RX in FIGS. 2$a$ and 2$b$). However, when the antenna system is operating in the reception mode, it is possible to tune the transmission antenna to the reception frequency, as shown in FIG. 2$b$, so that the transmission antenna can be used as another reception antenna, for receiving signals in the reception frequency.

FIGS. 3$a$ and 3$b$ show the difference between the reception frequency (RX1) of one operating mode and the reception frequency (RX2) of another operating mode in a dual-mode communications system, such as the system 1$c$ shown in FIG. 1$c$ and the system 1$d$ in FIG. 1$d$. For example, one operating mode is GSM-850 and the other operating mode is WCDMA-1900. As shown in FIG. 1$c$, the antenna 12 of the subsystem 122 is optimally tuned at the reception frequency RX1 for receiving signals at the GSM frequencies when the system 1$c$ is operating in the GSM-850 mode. However, when the system 1$c$ is operating in the WCDMA-1900 mode, it is possible to tune the antenna 12 of the subsystem 122 to the reception frequency RX2 so that the antenna 12 also receives signals in the WCDMA mode for space diversity purposes.

Figure 4:
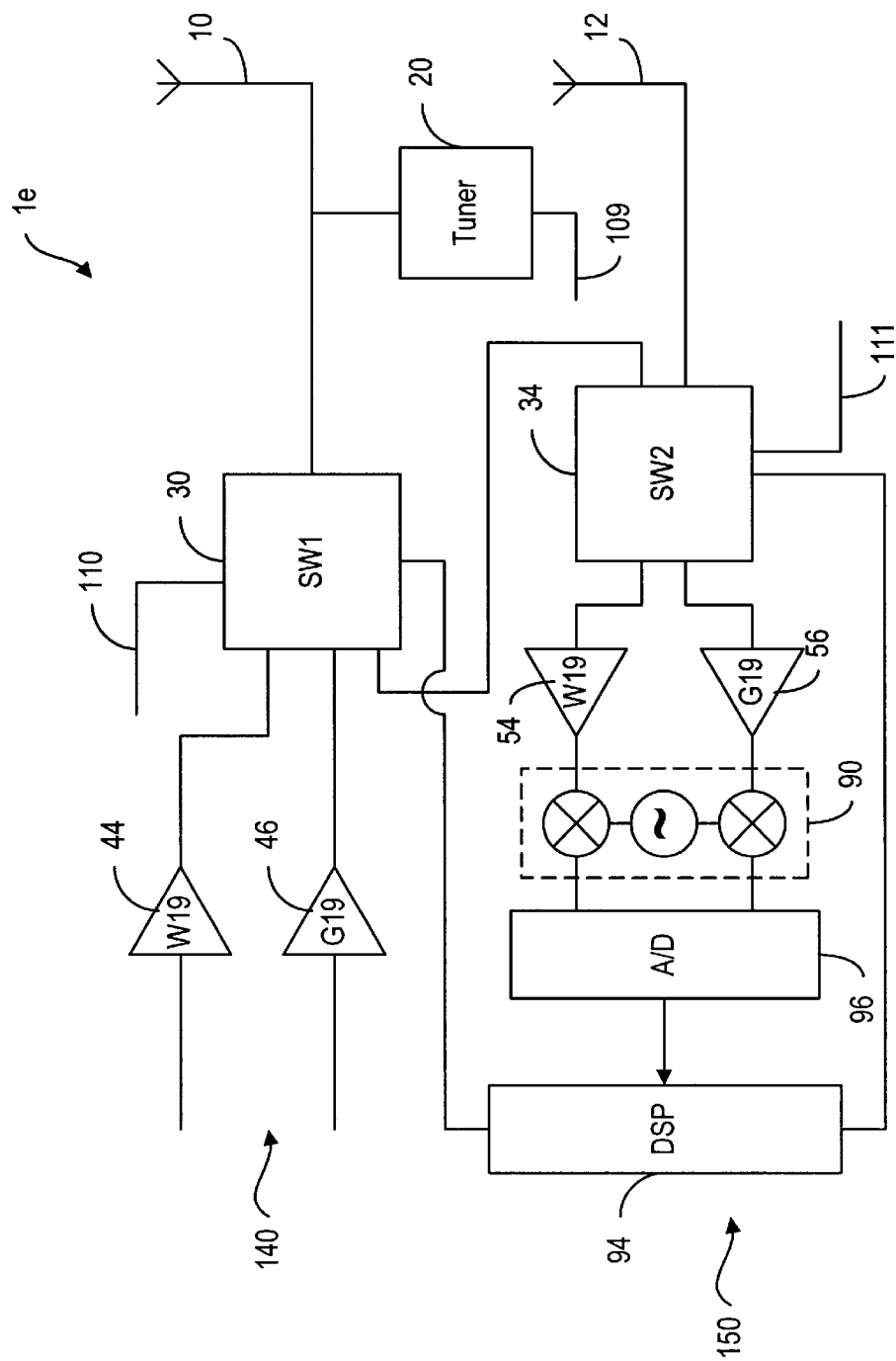
FIG. 4 is a block diagram showing an antenna system for WCDMA-1900/GSM-1900 transmission and reception, wherein the transmission antenna is tuned to the reception frequency for space diversity reception.

FIG. 4 is an exemplary communications system capable of operating in WCDMA-1900 and GSM-1900 modes. As shown, the system 1$e$ comprises a first subsystem 140 and a second subsystem 150. The first subsystem 140 includes a transmission antenna 10 operatively connected to a WCDMA-1900 transmitter 44 and a GSM-1900 transmitter 46 via a switch 30. The second subsystem 150 includes a reception antenna 12 operatively connected to a WCDMA-1900 receiver 54 and a GSM-1900 receiver 56 via a switch 34. For example, the normal operation mode is GSM-1900. The antenna 10 is optimally tuned at the transmission frequency for transmitting GSM signals and the antenna 12 is optimally tuned at the reception frequency for receiving GSM signals. When the system 1$e$ is operating in the reception mode, it is possible to tune the antenna 10 to the reception frequency by the tuner 20 under a control signal 109 so that the antenna 10 also receives GSM signals, along with the antenna 12. At the same time, the switch 30, under the control signal 110, routes the GSM signals received by the antenna 10 to the GSM RF path in the receiving end via the switch 34. Under a control signal 111, the switch 34 routes the GSM signals received by either the antenna 10 or the antenna 12 to the GSM-1900 receiver 56. The combination of the received signals by the antennas 10 and 12 is carried out in a digital signal processor 94 after the signals are downconverted in a mixer 90 and converted from an analog form to a digital form by an analog-to-digital converter 96. The antenna 10 and the antenna 12 are placed apart from each other, at a distance exceeding a quarter wavelength of the operating frequency. The embodiment of FIG. 4 is one example showing how the space diversity principle, as illustrated in FIG. 1$a$, is used. The control signals 109, 110 and 111 can be provided by the processor 94, for example.

Figure 5:
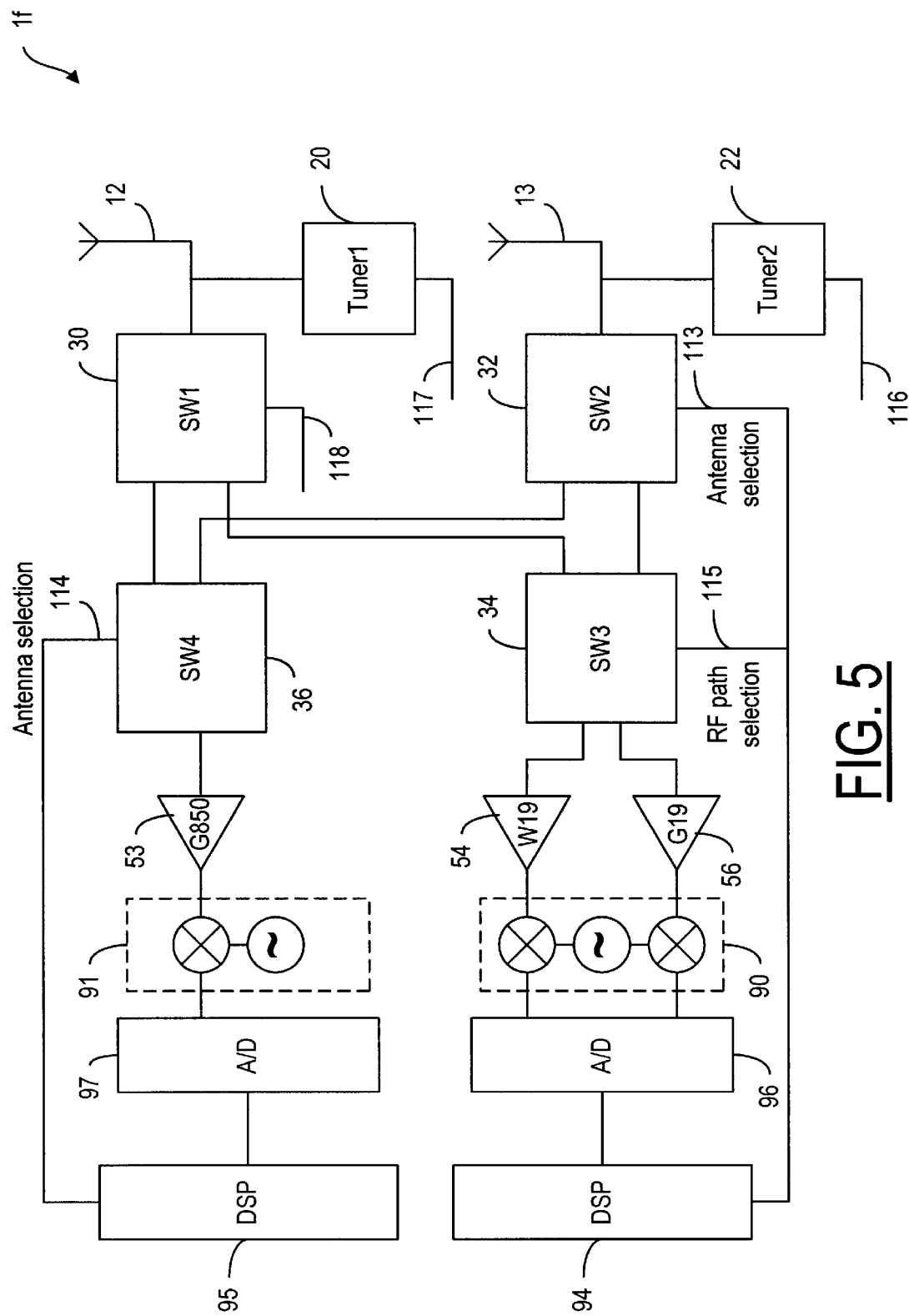
FIG. 5 is a block diagram showing an antenna system having a first subsystem for GSM-850 and a second subsystem for WCDMA-1900/GSM-1900, wherein the antenna for he one subsystem is tuned to the reception frequency of the other subsystem for space diversity reception.

FIG. 5 is an exemplary communications system capable of operating in GSM-850, WCDMA-1900 and GSM-1900 modes. As shown, the system 1$f$ includes a first antenna 12 operatively connected to a GSM-850 receiver 53 via a switch 36 and an antenna selecting switch 30, and a second antenna 13 operatively connected to a WCDMA-1900 receiver 54 and a GSM-1900 receiver 56 via an antenna selecting switch 32 and RF path selecting switch 34. In normal operations, the antenna 12 is tuned at the reception frequency of GSM-850 for reception, whereas the antenna 13 is tuned at the reception frequency of GSM-1900/WCDMA-1900 for reception. However, when the system 1$f$ is operating in the GSM-850 mode, the antenna 13 can be tuned by the tuner 22 to the reception frequency of the GSM-850 mode so that the antenna 13 also receives signals in the GSM-850 mode. At the same time, an antenna selection signal 113 causes the switch 32 to route the signals in the GSM-850 mode, received by the antenna 13 to the switch 36, to the GSM-850 RF path. The switch 36, under the control signal 114, selects the signals from the antenna 12 or the signals from the antenna 13 based on the signal-to-noise ratio or with other signal strength indicators. The signals from the receiver 53 are then down-converted by a mixer 91 into a digital form by an analog-to-digital converter 97 and further processed in a digital signal processor 95. Likewise, when the system 1$f$ is operating in the WCDMA-1900 mode, for example, the antenna 12 can be tuned by the tuner 20 to the reception frequency of the WCDMA-1900 mode so that the antenna 12 also receives signals in the WCDMA-1900 mode. At the same time, an antenna selection signal 118 causes the switch 30 to route the signals in the WCDMA-1900 mode received by the antenna 12 to the WCDMA-1900 RF path. The switch 34, under a control signal 115, conveys the signals received by the antenna 12 or the signals received by the antenna 13 to the WCDMA-1900 receiver 54. The signals from the receiver 54 are then down-converted by the mixer 90 into a digital form by the analog-to-digital converter 96 and further processed in the digital signal processor 94. The combination of 1900 MHz signals coming from antennas 12 and 13 are carried out digitally in the processor 94, whereas the combination of 850 MHz signals coming from antennas 12 and 13 are based on the selection carried out with the switch 36. The control signal 117 can be provided by the processor 95, and the control signals 116, 118 can be provided by the processor 94. The embodiment of FIG. 5 is one example showing how the space diversity principle, as illustrated in FIG. 1d, is used.

The combined reception, as illustrated in FIGS. 1a–1d and FIGS. 4 and 5, is most advantageous when the level of received signals are low. In the case of combined reception, as shown in FIGS. 4 and 5, the different linearities of the RF paths should not pose a problem. Normally different air-interface systems will yield different linearity requirements of the receiver and other individual components.

It should be noted that WCDMA and GSM systems have been used to demonstrate how the combined reception is used in the space diversity scheme. However, the present invention is not limited only to these systems. Furthermore, the routing of signals from the transmission antenna to the receiver, as shown in FIGS. 1a and 3, or the routing of signals from the antenna of one operating mode to the receiver of the other operating mode, as shown in FIGS. 1a–1d and FIG. 4, can be done by switches, switchplexers or circulators. Moreover, the transmission antenna 10 in FIG. 1b and FIG. 1d can also be used as a third reception antenna for combined reception if it is tuned to the reception frequency of the subsystem 130, 134 and the signals received by the third reception antenna are routed to the transceiver 60 and receiver 62. Likewise, the antenna 15 in FIG. 1d can be used as a fourth reception antenna for combined reception and the signals received by the fourth reception antenna are routed to the receiver 62 or receiver 50. Thus, the present invention includes the combined reception from two, three or more reception antennas, so long as these antennas are placed apart, at a distance exceeding a quarter wavelength of the operating frequency. The combination of signals received by two or more reception antennas can be carried out in analog summing devices, or in a digital signal processor as bits.

It should also be noted that the placement of the tuners 20, 22, as shown in FIGS. 1a–1d, 4 and 5, need not be between the feed line and the antenna. The tuners could be located somewhere else in the near vicinity of the antenna or located in the antenna element itself.

The foregoing discussion has been focused on space diversity reception, wherein two antennas separated by a distance substantially equal to or exceeding a quarter-wavelength are used to receive signals in the same frequency band for combining. The same principle is applicable to space diversity transmission. For example, in FIG. 1a, if box 40 is a receiver and box 50 is a transmitter, then the system 1 a can be used for space diversity transmission as follows. The antenna 12 is optimally tuned to a transmission frequency for transmitting signals provided by box 50. The antenna 10 is optimally tuned to a reception frequency for receiving signals and conveying the received signals to box 40 when the system 1a is used for reception. However, it is possible to tune the antenna 10 to the transmission frequency by the tuner 20 when the system 1c is used for transmission so that the antenna 10, through the switch 30, and the antenna 12 can both be used to transmit signals provided by box 50.

Likewise, the antennas 12 and 13, as shown in FIG. 1c, can be optimally tuned at different transmission frequencies (G850 and G1900, for example) for transmission. It is possible to tune the antenna 12 by the tuner 20 to the transmission frequency of the antenna 13 by the tuner 20, so that the antenna 12, through the switch 30, and the antenna 13 can both be used to transmit signals provided by the transmitter 62. It is also possible that the antenna 12 is optimally tuned at a transmission frequency for transmission, and the antenna 13 is optimally tuned at a reception frequency for reception. For space diversity transmission purposes, the antenna 13 is tuned to the transmission frequency by the tuner 22 so that the antenna 13, through the switch 32, and the antenna 12, are both used for transmitting signals provided by the transmitter 52.

Thus, although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A radio frequency antenna system (1e) capable of operating in a transmission mode and a reception mode, said system comprising:

a first antenna (12) optimally tuned for receiving signals in a first frequency band;

a second antenna (10) optimally tuned for transmitting signals in a second frequency band different from the first frequency band when the system is operating in the transmission mode; and means (20), operatively connected to the second antenna (10), for tuning the second antenna (10) to a third frequency band substantially equal to the first frequency band when the system is operating in the reception mode so that the second antenna (10) also receives the signals in the first frequency band.

2. The antenna system of claim 1, further comprising means (30), operatively connected to the first antenna (12) and the second antenna (10) when the system is operating in the reception mode, for combining the signals in the first frequency band received by the second antenna (10) and the signals received by the first antenna (12).

3. The antenna system of claim 2, wherein the combining means comprises a signal processor (94) for combining the signals in a digital form.

4. The antenna system of claim 3, wherein the signal processor (94) is operatively connected to the tuning means (20) for providing a control signal (109) to the tuning means (20) for effecting said tuning.

5. The antenna system of claim 1, wherein the first antenna (12) is disposed apart from the second antenna (10) by a distance substantially equal to or exceeding a quarter wavelength of the first frequency band.

6. The antenna system of claim 1, wherein the second antenna is capable of operating in a TDMA mode.

7. The antenna system of claim 1, wherein the first antenna is capable of operating in a TDMA mode.

8. A method of transmitting and receiving radio frequency signals in a telecommunications device (150), said device having a first antenna (12) optimally tuned for receiving signals in a first frequency band; and a second antenna (10) operable in a transmission mode and a reception mode, wherein the second antenna is optimally tuned for transmitting signals in a second frequency band different from the first frequency band when the second antenna is operating in the transmission mode, said method comprising the step of tuning the second antenna to a third frequency band substantially equal to the first frequency band when the second antenna is operating in the reception mode so that the second antenna also receives the signals in the first frequency band.

9. The method of claim 8, wherein the first antenna is disposed apart from the second antenna by a distance substantially equal to or exceeding a quarter wavelength of the first frequency band.

10. The method of claim 8, further comprising the step of combining the signals in the first frequency received by the second antenna and the signals received by the first antenna.

11. A radio receiver system (1d) operable at a first mode and a second mode, the system having a first subsystem (134) and a second subsystem (124), wherein the first subsystem (134) includes a first receiver (62) and a first antenna (13) capable of receiving signals in the first mode in a first frequency range for providing the received signals to the first receiver (62), and the second subsystem (124) includes a second receiver (50) and a second antenna capable of receiving signals in the second mode in a second frequency range different from the first frequency range for providing the received signals to the second receiver (50), said system comprising:

a first means (22), operatively connected to the first antenna (13), for tuning the first antenna to a reception frequency in the second frequency range when the system is operating in the second mode, such that the first antenna (13) also receives the signals in the second mode in the second frequency range; and a second means (32), operatively connected to the first antenna (13) and the second receiver (50), for routing the signals received by the first antenna (13) in the second mode to the second receiver (50).

12. The system of claim 11, wherein the second means (32) comprises a switch.

13. The system of claim 11, wherein the second means (32) comprises a circulator.

14. The system of claim 11, wherein the second means (32) comprises a switchplexer.

15. The system of claim 11, wherein the first subsystem (134) further includes a first transmitter (70) and a third antenna (15) capable of transmitting signals in the first mode provided by the first transmitter (70).

16. The system of claim 11, further comprising:

a third means (20), operatively connected to the second antenna (12), for tuning the second antenna (12) to a reception frequency in the first frequency range when the system is operating in the first mode, such that the second antenna (12) also receives the signals in the first mode in the first frequency range; and a fourth means (30), operatively connected to the second antenna (12) and the first receiver (62), for routing the signals received by the second antenna (12) in the first mode to the first receiver (62).

17. The system of claim 16, wherein the first subsystem (134) further includes a first transmitter (70) and a third antenna (15) capable of transmitting signals in the first mode provided by the first transmitter (70).

18. The system of claim 17, wherein the second subsystem further includes a second transmitter (40) and a fourth antenna (10) capable of transmitting signals in the second mode provided by the second transmitter (40).

19. A radio communication system (1e) including a first subsystem (150) and a second subsystem (140), wherein the first subsystem (150) includes a receiver (54) operating at a first frequency range, and the second subsystem (140) includes a transmitter (44) operating at a second frequency range different from the first frequency range, said system comprising:

a first antenna (12) operatively connected to the receiver (54) and optimally tuned for receiving signals in the first frequency range and conveying the received signals to the receiver (54) when the system is used for reception;

a second antenna (10) operatively connected to the transmitter (44) and optimally tuned to the second frequency for transmitting signals from the transmitter (44) when the system is used for transmission;

a tuning mechanism (20), operatively connected to the second antenna (10) for tuning the second antenna (10) to a third frequency range substantially equal to the first frequency range when the system is used for reception, so that the second antenna also receives signals in the first frequency range; and means (30, 34), operatively connected to the second antenna (10) and the receiver (54), for conveying the signals in the first frequency range received by the second antenna (10) to the receiver when the system is used for reception.

20. The system of claim 19, wherein the first subsystem (150) further comprises means (94), operatively connected to the tuning mechanism (20), for providing a control signal (109) to the tuning mechanism (20) to effect said tuning of the second antenna (10) to the third frequency range.

21. The radio communication system of claim 19, wherein the first subsystem (150) is operable in a first mode (W19) and in a different second mode (G19), and the receiver (54) is operable in a first mode (W19), and wherein the first subsystem (150) further includes:

a further receiver (56) operable in the second mode (G19), and a switching means (34), operatively connected to the receiver (54), the further receiver (56) and the first antenna (12), for conveying the signals received by the first antenna (12) to the receiver (54) when the first subsystem is operating in a first mode (W19), and for conveying the signals received from the second antenna (10) to the further receiver (G19) when the first subsystem is operating in the second mode (G19).

22. The system of claim 21, wherein the second subsystem (140) is operable in the first mode (W19) and in the second mode (G19), and the transmitter (94) is operable in the first mode (W19), and wherein the second subsystem (140) further includes:

a further transmitter (46) operable in the second mode (G19), and a further switching means (30), operatively connected to the transmitter (44), the further transmitter (46) and the second antenna (12), for conveying the signals received by the second antenna (12) to the transmitter (44) when the second subsystem is operating in the first mode (W19), and conveying the signals received by the second antenna (12) to the further transmitter (46) when the second subsystem (140) is operating in the second mode (G19).

23. A method of radio telecommunications in a telecommunications device (1f) operable in a first mode (G850) in a first frequency range and a second mode (G19) in a second frequency range different from the first frequency range, the device (1f) including:

a first antenna (12) capable of receiving signals in the first frequency range and conveying the received signals in the first frequency range to a first receiver (53), when the device is operating in the first mode (G850); and a second antenna (13) capable of receiving signals in the second frequency range and conveying the received signals in the second frequency range to a second receiver (56), when the device is operating in the second mode (G19), said method comprising the steps of:

tuning the first antenna to a reception frequency in the second frequency range (1900) when the device is operating in the second mode (G19), such that the first antenna (12) also receives the signals in the second frequency range; and providing the signals received in the second frequency range by the first antenna (12) to the second receiver (56).

24. The method of claim 23, further comprising the steps of:

tuning the second antenna (13) to a reception frequency in the first frequency range when the device is operating in the first mode, such that the second antenna (13) also receives the signals in the first frequency range; and providing the signals received in the first frequency range by the second antenna (13) to the first receiver (53).

* * * * *